US009558542B2

(12) United States Patent
Xu et al.

(10) Patent No.: US 9,558,542 B2
(45) Date of Patent: Jan. 31, 2017

(54) METHOD AND DEVICE FOR IMAGE PROCESSING (71) Applicant: Xiaomi Inc., Beijing (CN)

(72) Inventors: Fei Xu, Beijing (CN); Weixing Li, Beijing (CN); Yahui Wang, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 14/585,611

(22) Filed: Dec. 30, 2014

(65) Prior Publication Data

US 2015/0110419 A1 Apr. 23, 2015

Related U.S. Application Data (63) Continuation of application No. PCT/CN2013/078983, filed on Jul. 8, 2013.

(30) Foreign Application Priority Data

Jul. 12, 2012 (CN) .......................... 2012 1 0242268

(51) Int. Cl.
*G06K 9/36* (2006.01)
*G06T 5/50* (2006.01)
(Continued)

(52) U.S. Cl.
CPC ............ *G06T 5/50* (2013.01); *G06F 3/04817* (2013.01); *G06T 7/0022* (2013.01); *G06T 11/60* (2013.01); *G06T 2207/20221* (2013.01)

(58) Field of Classification Search
CPC G06F 3/04817; G06F 3/0482; G06F 3/04842; G06T 11/40; G06T 11/60; G06T 5/50; G06T 7/0022; G06T 2207/20221
(Continued)

(56) References Cited

U.S. PATENT DOCUMENTS

2007/0052725 A1* 3/2007 Ostojic ................. G06F 3/0482
345/625
2007/0083911 A1* 4/2007 Madden ............... G06F 3/0482
725/135
(Continued)

FOREIGN PATENT DOCUMENTS

CN 101308445 A 11/2008
CN 101594427 A 12/2009
(Continued)

OTHER PUBLICATIONS

International Search Report of PCT/CN2013/078983, from the State Intellectual Property Office of China, mailed Oct. 3, 2013.
(Continued)

*Primary Examiner* — Ali Bayat
(74) *Attorney, Agent, or Firm* — Finnegan, Henderson, Farabow, Garrett & Dunner LLP (57) ABSTRACT A method for image processing includes determining an application picture of a target application and an actual environment for the target application as triggered by a preview event, obtaining a background picture according to the actual environment, performing an image processing on at least one of the application picture or the background picture so that a significance of the application picture is higher than a significance of the background picture, and outputting a combination of the application picture and the background picture in a preview environment.

18 Claims, 10 Drawing Sheets (51) Int. Cl.
*G06F 3/0481* (2013.01)
*G06T 7/00* (2006.01)
*G06T 11/60* (2006.01)

(58) Field of Classification Search
USPC ........................................................ 382/284
See application file for complete search history.

(56) References Cited

U.S. PATENT DOCUMENTS

| | | | | |
|---|---|---|---|---|
| 2007/0150832 | A1* | 6/2007 | Ohnishi | G06F 21/84 715/800 |
| 2007/0189737 | A1* | 8/2007 | Chaudhri | G06F 3/0482 386/234 |
| 2009/0007012 | A1 | 1/2009 | Mandic et al. | |
| 2011/0154268 | A1* | 6/2011 | Trent, Jr. | G06F 3/04883 715/863 |
| 2011/0185313 | A1* | 7/2011 | Harpaz | G06F 3/0482 715/826 |
| 2011/0225492 | A1* | 9/2011 | Boettcher | G06F 3/0485 715/702 |

FOREIGN PATENT DOCUMENTS

| | | |
|---|---|---|
| CN | 101625696 A | 1/2010 |
| CN | 101706724 A | 5/2010 |
| CN | 101795322 A | 8/2010 |
| CN | 102077159 A | 5/2011 |
| CN | 102253795 A | 11/2011 |
| CN | 102800045 A | 11/2012 |
| JP | 2011-160030 A | 8/2011 |
| KR | 2011-0036539 A | 4/2011 |
| RU | 2396590 C2 | 8/2010 |
| WO | WO 2011/129586 A2 | 10/2011 |

OTHER PUBLICATIONS

Russian First Office Action of Russian Application No. 2014149086/08, dated Jun. 22, 2016, issued by Russian Patent Office (8 pages).

European Search Report of European Application No. 13816952.9, dated Dec. 11, 2015 (6 pages).

Matsuyama, S., "For Windows users and beginners of MAC! Field guide of Mac," Mac Fan, vol. 17, No. 11, Daily Communications Co., Ltd., Nov. 1, 2009, pp. 102-103.

Yanagisawa, J., "A convenient application named 'Dashboard Widget'," Tabloid, the first edition of 100 softwares to use Mac OS X usefully, Sotechsha Co. Ltd., Jun. 30, 2008 (The First Edition), pp. 26-28.

\* cited by examiner

METHOD AND DEVICE FOR IMAGE PROCESSING

CROSS-REFERENCE TO RELATED APPLICATIONS

This application is a Continuation Application of International Application No. PCT/CN2013/078983, filed on Jul. 8, 2013, which is based upon and claims the benefit of priority to Chinese Patent Application No. 201210242268.7, filed on Jul. 12, 2012, the entire contents of which are incorporated herein by reference.

TECHNICAL FIELD

The disclosure relates to image processing technology and, more particularly, to a method and device for image processing.

BACKGROUND

With the development of communication technology and value-added service, more and more mobile terminal applications have been developed, and user experience is getting better and better. A "preview" is a useful sub-application, which is used in many application programs. Through "preview," a user can see the effect of running the application before determining a final application.

Figure 1:
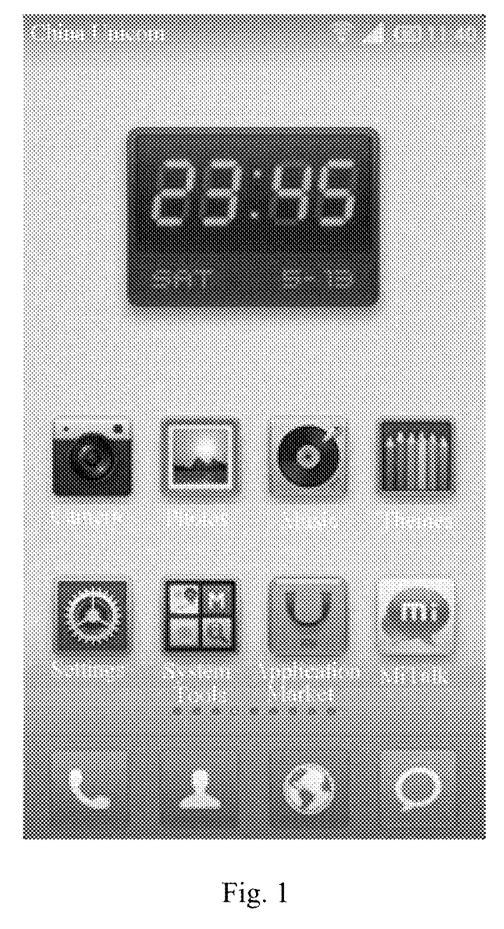
FIG. 1 is a schematic view showing a conventional preview mode.

Currently, the "preview" sub-application is implemented by "overlaying" a selected picture of a target application on a simulated environment, so as to provide a simulation style "similar to" a real application scenario. That is, a background picture is preset and then a picture of the target application is "overlaid" on the background picture, as shown in FIG. 1, taking a desktop clock application as an example.

SUMMARY

In accordance with the disclosure, there is provided a method for image processing. The method includes determining an application picture of a target application and an actual environment for the target application as triggered by a preview event, obtaining a background picture according to the actual environment, performing an image processing on at least one of the application picture or the background picture so that a significance of the application picture is higher than a significance of the background picture, and outputting a combination of the application picture and the background picture in a preview environment.

Also in accordance with the disclosure, there is provided a device for image processing. The device includes a processor and a non-transitory computer-readable storage medium storing instructions. The instructions, when executed by the processor, cause the processor to determine an application picture of a target application and an actual environment for the target application as triggered by a preview event, obtain a background picture according to the actual environment, perform an image processing on at least one of the application picture and the background picture so that a significance of the application picture is higher than a significance of the background picture, and output a combination of the application picture and the background picture in a preview environment.

Also in accordance with the disclosure, there is provided a non-transitory computer-readable storage medium having stored therein instructions. The instructions, when executed by a processor of a mobile terminal, cause the mobile terminal to determine an application picture of a target application and an actual environment for the target application as triggered by a preview event, obtain a background picture according to the actual environment, perform an image processing on at least one of the application picture and the background picture, so that a significance of the application picture is higher than a significance of the background picture, and output a combination of the application picture and the background picture in a preview environment.

It should be understood that the above general description and the detailed description below are merely exemplary and explanatory, and do not limit the disclosure.

The accompanying drawings, which are incorporated in and constitute a part of this specification, illustrate several embodiments of the invention and together with the description, serve to explain the principles of the invention.

DETAILED DESCRIPTION

Embodiments consistent with the disclosure include a method and device for image processing.

Hereinafter, embodiments consistent with the disclosure will be described in reference to the drawings. Wherever possible, the same reference numbers will be used throughout the drawings to refer to the same or like parts. The embodiments described herein are used merely to illustrate and explain rather than to limit the embodiments of the disclosure.

According to embodiments of the disclosure, a picture of a target application (hereinafter also referred to as an "application picture") and/or a background picture are modified so that the application picture becomes more eye-catching. As a result, a display effect of a preview image is improved, and the user can see the preview effect more clearly.

Figure 2:
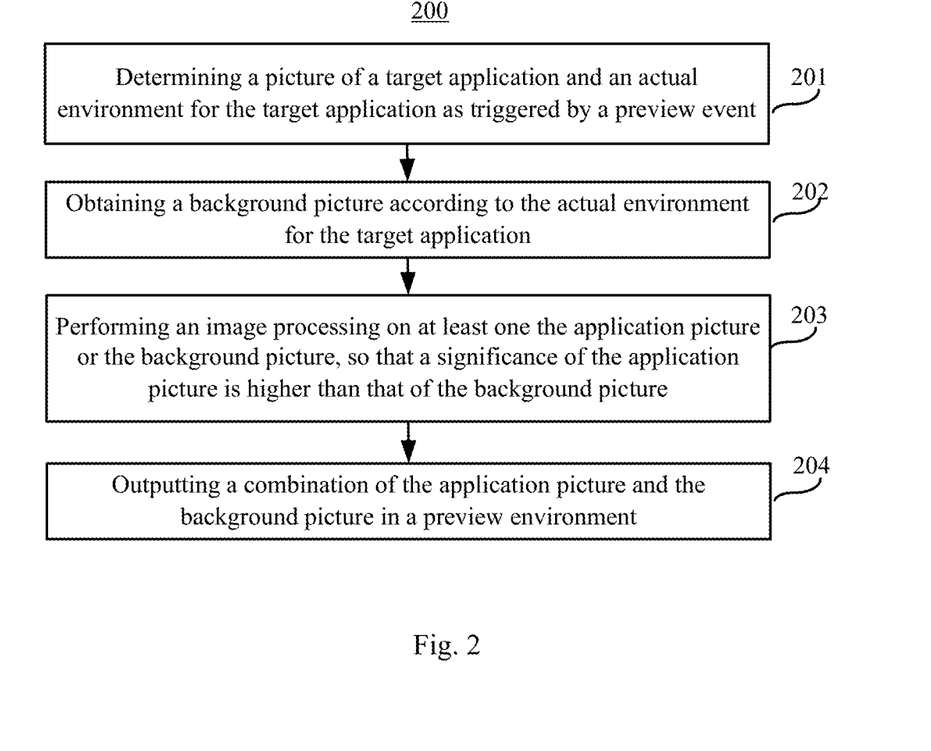
FIG. 2 is a flowchart showing an exemplary method for image processing according to an embodiment of the disclosure.

FIG. 2 is a flow chart showing an exemplary method 200 for image processing consistent with embodiments of the disclosure. As shown in FIG. 2, at 201, a picture of a target application and an actual environment for the target application are determined as triggered by a preview event. At 202, a background picture is obtained according to the actual environment for the target application. At 203, an image processing is performed on at least one of the application picture or the background picture, so that a significance of the application picture is higher than that of the background picture. At 204, a combination of the application picture and the background picture is output in a preview environment.

According to method 200, the application picture, the background picture, or both of them can be modified, as long as such a modification renders the significance of the application picture higher than that of the background picture. The significance is reflected in at least one of four factors: grayscale, luminance, chrominance, and transparency. Each factor may also be referred to as a property of a picture. For example, the application picture has a higher value in at least one of luminance or chrominance than the background picture, or the application picture has a lower value in at least one of grayscale or transparency than the background picture. Which factor or factors needs to be modified in value depends on a format of the pictures and the value of the factors. For example, the transparency of the background picture can be reduced to both ensure the authenticity of the application picture and highlight the application picture, so that the user can more easily see the display effect of the application picture during the preview.

In some embodiments, whether the background picture is modified is determined based on whether the value of at least one of the grayscale, the luminance, the chrominance, or the transparency of the background picture is within a predetermined range. If so, the background picture is modified by modifying the value of that factor. Otherwise, no modification is performed. Specifically, if the luminance or the chrominance of the background picture is larger than a threshold value for that factor, then the value of that factor of the background picture is reduced to be equal to or smaller than the threshold value for that factor. Similarly, if the grayscale or the transparency of the background picture is smaller than a threshold value for that factor, then the value of that factor of the background picture is increased to be equal to or larger than the threshold value for that factor. In some embodiments, the threshold value for a factor is determined by the value of that factor of the application picture and a preset amplitude of that factor. The preset amplitude of a factor may be, for example, 10%~20% of the value of that factor of the application picture. That is, the threshold value for the luminance or the chrominance may be a value 10%~20% lower than the value of that factor of the application picture, and the threshold value for the grayscale or the transparency may be a value 10%~20% higher than the value of that factor of the application picture.

In some embodiments, the background picture is a picture of the actual environment in which the target application is not running. In this scenario, outputting the combination of the application picture and the background picture in the preview environment (204 in FIG. 2) includes overlaying the application picture on the background picture and then outputting the overlaid picture in the preview environment.

In some embodiments, the background picture is a picture of the actual environment in which the target application has been applied but with the application picture being clipped from a clipped region. In this scenario, outputting the combination of the application picture and the background picture in the preview environment includes filling the application picture into the clipped region and then outputting the filled picture in the preview environment.

Figure 3:
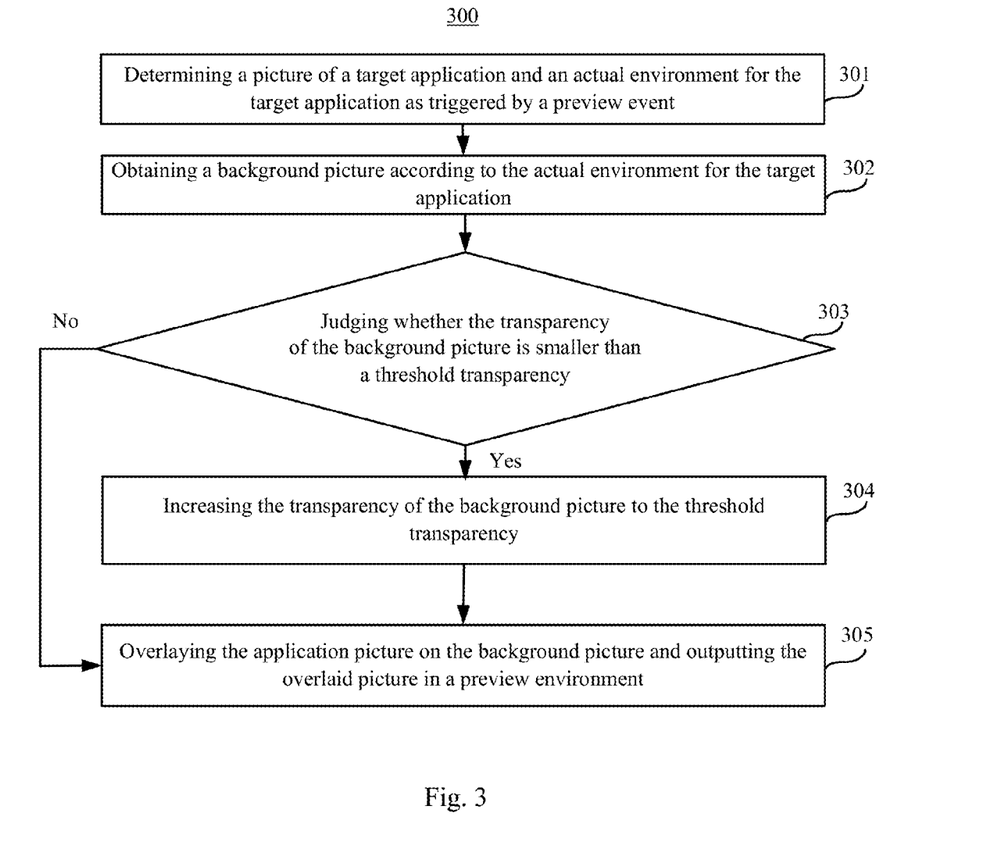
FIG. 3 is a flowchart showing an exemplary method for image processing while the background picture is a picture of the actual environment in which a target application is not running according to an embodiment of the disclosure.

FIG. 3 is a flow chart showing an exemplary method 300 for image processing consistent with embodiments of the disclosure. FIG. 3 shows the scenario in which the background picture is a picture of the actual environment in which the target application is not running.

Figure 4:
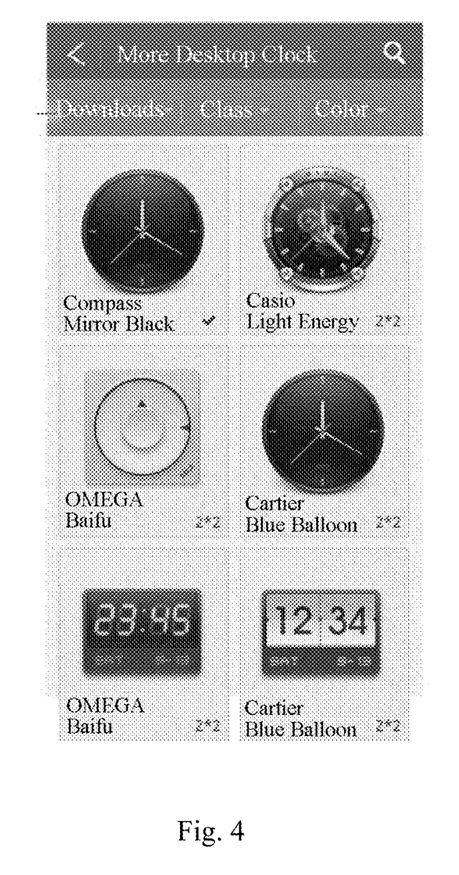
FIG. 4 is a schematic view showing alternative styles of a desktop clock according to an embodiment of the disclosure.
Figure 5:
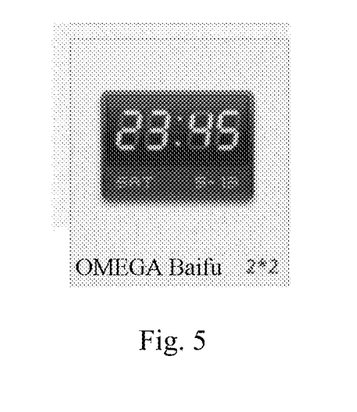
FIG. 5 is a schematic view showing a selected clock style according to an embodiment of the disclosure.

As shown in FIG. 3, at 301, a picture of a target application and an actual environment for the target application are determined as triggered by a preview event. The method further includes determining a position where the application picture of the target application is to be located. For example, the application picture can be located at a first page or a second page of a homepage, or a homepage of another application. The method also includes determining other icons or pictures in that page. For example, the user selects a clock style from candidate styles shown in FIG. 4 for a desktop time tool. The selected clock style is shown in FIG. 5.

Figure 6:
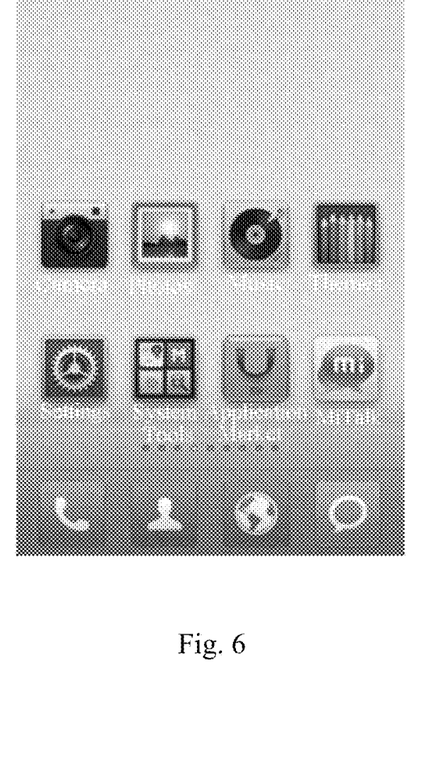
FIG. 6 is a schematic view showing the first page of a homepage in which a desktop time tool picture is not included according to an embodiment of the disclosure.

Referring again to FIG. 3, at 302, a background picture is obtained according to the actual environment for the target application. The background picture is a picture of the actual environment in which the target application is not running, and the background picture includes icons or pictures of other applications, such as the background picture shown in FIG. 6.

At 303, it is judged whether the transparency of the background picture is smaller than a threshold transparency. If so (303—Yes), the process proceeds to 304. Otherwise (303—No), the process proceeds to 305. The threshold transparency may be a sum of the transparency of the application picture and a preset amplitude of transparency. In some embodiments, the preset amplitude of transparency is 10%~20% of the transparency of the application picture.

At 304, the transparency of the background picture is increased to the threshold transparency.

Figure 7:
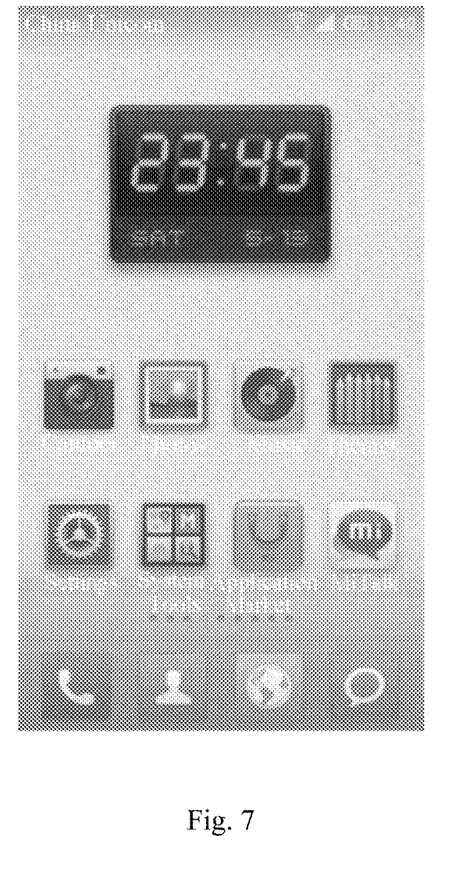
FIG. 7 is a schematic view when a preview is performed according to an embodiment of the disclosure.

At 305, the application picture is overlaid on the background picture and then the overlaid picture is output in the preview environment. In the example of the desktop time tool, the processed picture is shown in FIG. 7, in which the processed background picture is displayed as a gray image while the desktop time tool is displayed at its actual value. According to the disclosure, the processed picture can be displayed in full screen or non-full screen.

Figure 8:
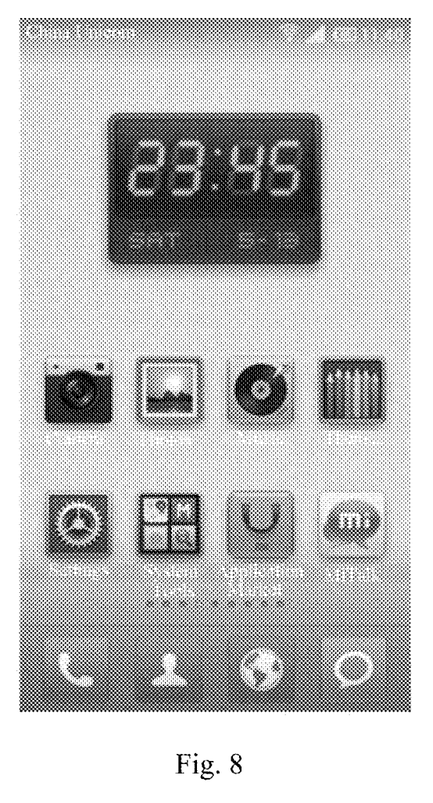
FIG. 8 is a schematic view showing an actual application according to an embodiment of the disclosure.

According to the disclosure, in the preview, the display pixel values of the background picture are modified when the background picture is displayed, but the background picture itself is not modified. When it is confirmed to adopt the target application after the preview, the background picture is displayed with its actual values. In the example of the desktop time tool, after the target application is confirmed to be used, the background picture is shown in FIG. 8. Unlike the background picture in FIG. 7, which is displayed as a gray image, the background picture in FIG. 8 is displayed with its actual values. That is, in FIG. 8 the background picture is displayed with its actual transparency, but in FIG. 7 the background picture is displayed with a transparency larger than its actual transparency. Therefore, the background picture in FIG. 7 appears to be more transparent than that in FIG. 8, so as to highlight the desktop time tool.

Figure 9:
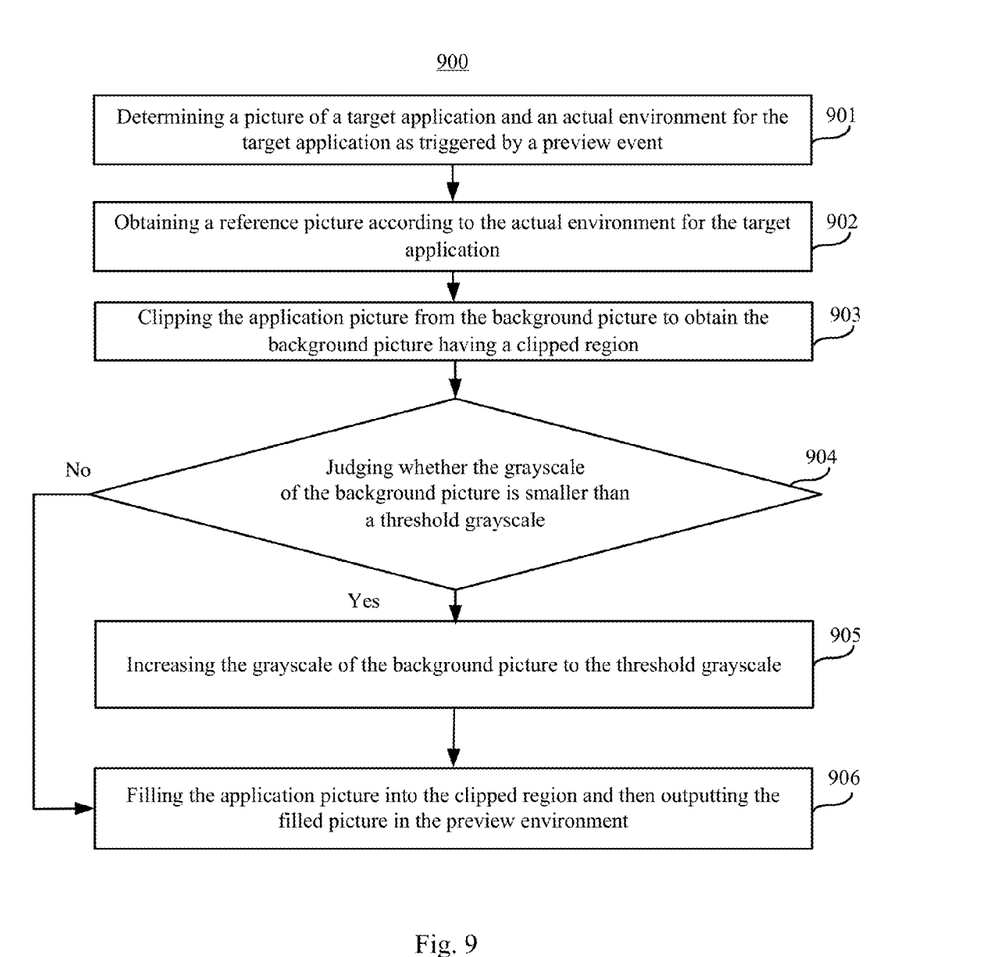
FIG. 9 is a flowchart showing an exemplary method for image processing when a background picture is a picture obtained by clipping a region where a picture of the target application is located from the picture of an actual environment in which the target application is applied according to an embodiment of the disclosure.

FIG. 9 is a flow chart showing another exemplary method 900 for image processing consistent with embodiments of the disclosure. FIG. 9 shows the scenario in which the background picture is a picture obtained by clipping a region where the application picture is located from a picture of the actual environment in which the target application has been applied.

Figure 10:
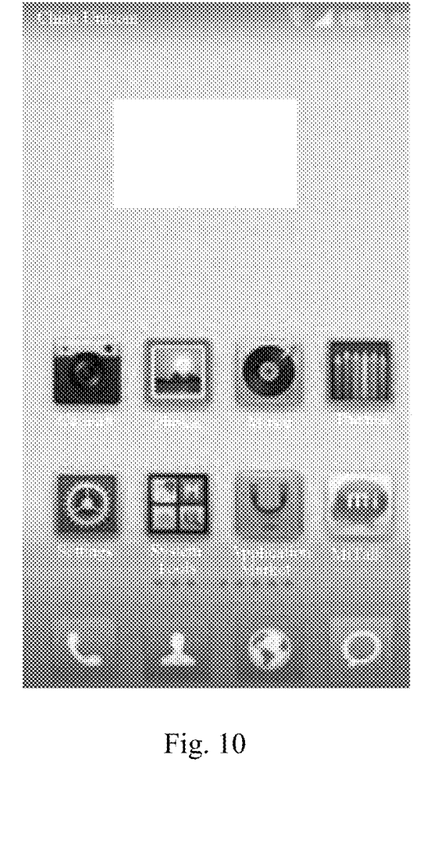
FIG. 10 is a schematic view showing a clipped first page of a homepage according to an embodiment of the disclosure.

As shown in FIG. 9, at 901, a picture of a target application and an actual environment for the target application are determined as triggered by a preview event. At 902, an environment picture is obtained according to the actual environment for the target application. The environment picture includes the application picture. At 903, the application picture is clipped from the environment picture, to obtain the background picture having a clipped region. FIG. 10 shows the background picture in the example of the desktop time tool, with the picture for the desktop time tool clipped. At 904, it is judged whether the grayscale of the background picture is smaller than a threshold grayscale. If so (904—Yes), the process proceeds to 905. Otherwise (904—No), the process proceeds to 906. The threshold grayscale may be a sum of the grayscale of the application picture and a preset amplitude of grayscale. In some embodiments, the preset amplitude of grayscale is 10%~20% of the grayscale of the application picture.

At 905, the grayscale of the background picture is increased to the threshold grayscale.

At 906, the application picture is filled into the clipped region and then the filled picture is output in the preview environment.

According to the disclosure, in the preview, the display pixel values of the background picture are modified when the background picture is displayed, but the background picture itself is not modified. When it is confirmed to adopt the target application after the preview, the background picture is displayed with its actual values.

Figure 11:
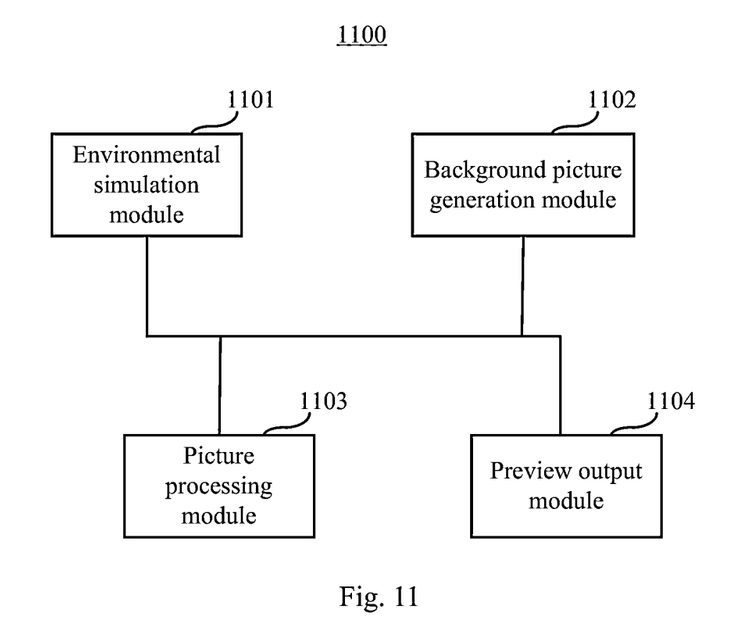
FIG. 11 is a structural diagram of a device according to an embodiment of the disclosure.

FIG. 11 schematically shows an exemplary device 1100 consistent with embodiments of the disclosure. The device 1100 includes an environment simulation module 1101, a background picture generation module 1102, a picture processing module 1103, and a preview output module 1104. The device 1100 can be included in, for example, a mobile phone or a computer.

The environment simulation module 1101 is configured to determine an application picture and an actual environment for the target application as triggered by a preview event.

The background picture generation module 1102 is configured to obtain a background picture according to the actual environment for the target application.

The picture processing module 1103 is configured to perform an image processing on at least one of the application picture or the background picture, so that a significance of the application picture is higher than that of the background picture. Specifically, the picture processing module 1103 modifies the value of at least one of the grayscale, the luminance, the chrominance, or the transparency of the at least one of the application picture or the background picture, so that the value of at least one of the luminance or the chrominance of the application picture is higher than that of the background picture, or the value of at least one of the grayscale or the transparency of the application picture is lower than that of the background picture. For example, the picture processing module 1103 increases the transparency of the background picture to make it higher than the transparency of the application picture.

In some embodiments, the picture processing module 1103 is further configured to judge whether the value of at least one of the grayscale, the luminance, the chrominance, or the transparency of the background picture is within a predetermined range. If so, the picture processing module 1103 modifies the background picture by modifying the value of that factor. Specifically, if the luminance or the chrominance of the background picture is larger than a threshold value for that factor, then the picture processing module 1103 reduces the value of that factor to be equal to or smaller than the threshold value for that factor. Similarly, if the grayscale or the transparency of the background picture is smaller than a threshold value for that factor, then the picture processing module 1103 increases the value of that factor of the background picture to be equal to or larger than the threshold value for that factor. In some embodiments, the threshold value for a factor is determined by the value of that factor of the application picture and a preset amplitude of that factor. The preset amplitude of a factor may be, for example, 10%~20% of the value of that factor of the application picture. That is, the threshold value for the luminance or the chrominance may be a value 10%~20% lower than the value of that factor of the application picture, and the threshold value for the grayscale or the transparency may be a value 10%~20% higher than the value of that factor of the application picture.

The preview output module 1104 is configured to output a combination of the application picture and the background picture in a preview environment. In some embodiments, the background picture is a picture of the actual environment in which the target application is not running. In this scenario, the preview output module 1104 overlays the application picture on the background picture and then outputs the overlaid picture in the preview environment. In some embodiments, the background picture is a picture of the actual environment in which the target application has been applied but with the application picture being clipped from a clipped region. In this scenario, the preview output module 1104 fills the application picture into the clipped region and then outputs the filled picture in the preview environment.

Figure 12:
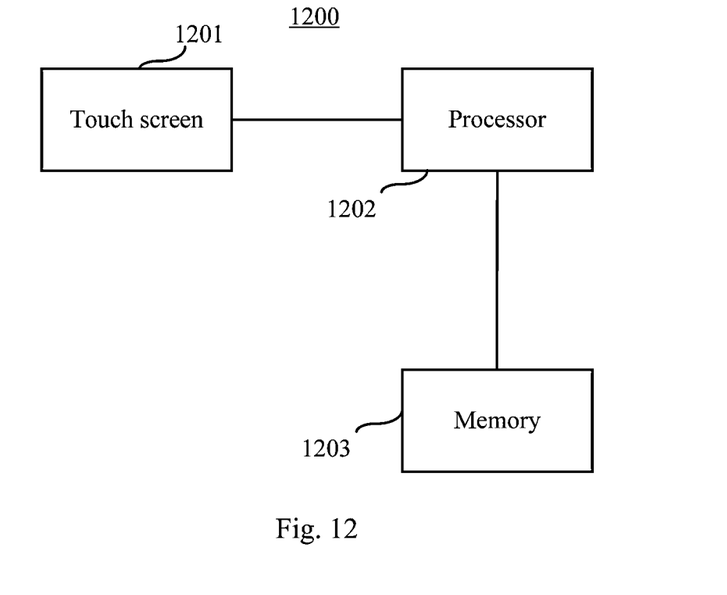
FIG. 12 is a structural diagram of a mobile phone according to an embodiment of the disclosure.

FIG. 12 schematically shows an exemplary mobile phone 1200 consistent with embodiments of the disclosure. The mobile phone 1200 includes a touch screen 1201, a processor 1202, and a memory 1203. The processor 1202 obtains the triggering of the preview event through the touch screen 1201, traverses records in the memory 1203, determines the application picture and the actual environment for the target application, and obtains various resources (including the icons or the pictures of other applications, etc.) in the actual environment. The processor 1202 further carries out the functions of the background picture generation module 1102, the picture processing module 1103, and the preview output module 1104.

Consistent with embodiments of the disclosure, the application picture is rendered more eye-catching by modifying the application picture and/or the background picture. As such, the display effect of the preview image is improved, and the user can see the preview effect more clearly. Moreover, according to the disclosure, various modifications in terms of, for example, the grayscale, the luminance, the chrominance, or the transparency, are provided, which are suitable for various picture formats, such as YUV (luminance and chrominance components) or RGB (red, green, and blue). Such flexible and diverse modifications can be applied to various scenarios. Further, the manner for processing the background picture according to the disclosure is not limited, which simplifies the processing process and improves the processing efficiency.

Those skilled in the art will now understand that the disclosure may be implemented in a method, a system, or a computer program product. Accordingly, the disclosure may be embodied in the form of hardware only, software only, or a combination thereof. Moreover, the disclosure may be embodied in the form of a computer program product implemented on one or more computer-readable storage media (including but not limited to a magnetic disk memory or an optic memory) containing computer-readable program codes.

The disclosure is described with reference to flow charts and/or block diagrams of the method, device (system), and computer program product according to the disclosure. It should be understood that each of the processes and/or blocks in the flow charts and/or the block diagrams, and any combination of the processes and/or blocks in the flow charts and/or the block diagrams may be embodied as computer program instructions. The computer program instructions may be provided to a processor of a general purpose computer, a dedicated computer, an embedded computer, or other programmable data processing device, so as to constitute a machine. Thus, a device for implementing those functions specified by one or more processes in the flow charts and/or one or more blocks in the block diagrams, may be achieved by instructions executed by the processor of the computer or the other programmable data processing device.

The computer program instructions may also be stored in a computer-readable memory, which may guide a computer or other programmable data processing device to operate in a specific manner, so that the instructions stored in the computer-readable memory may be embodied into a product including an instructions device, which may implement those functions specified by one or more processes in the flow charts and/or one or more blocks in the block diagrams.

The computer program instructions may also be loaded into a computer or other programmable data processing device, so that a series of operations may be performed in the computer or the other programmable data-processing device to achieve processes implemented by the computer. Thus, the instructions executed in the computer or the other programmable data-processing device may provide steps for implementing those functions specified by one or more processes in the flow charts and/or one or more blocks in the block diagrams.

It will be appreciated that various changes or modifications may be made to the disclosure without departing from the spirit and scope of the disclosure. Thus, the disclosure intends to cover such changes and modifications if those changes and modifications fall within the scope of claims and equivalents thereof in the disclosure.

What is claimed is:

1. A computer-implemented method for processing images displayed on a screen of a terminal, comprising:
    detecting, by a processor of the terminal, a preview event;
    determining, by the processor in response to detecting the preview event, an application picture of a target application running in the terminal and an actual environment for the target application;
    obtaining, by the processor, a background picture according to the actual environment;
    performing, by the processor, an image processing on at least one of the application picture or the background picture, so that a significance of the application picture is higher than a significance of the background picture; and
    displaying, by the processor, a combination of the application picture and the background picture in a preview environment on the screen.

2. The method according to claim 1, wherein performing the image processing includes:
    modifying at least one of a grayscale, a luminance, a chrominance, or a transparency of the at least one of the application picture or the background picture.

3. The method according to claim 2, wherein the modifying the at least one of the grayscale, the luminance, the chrominance, or the transparency of the at least one of the application picture or the background picture includes:
    increasing the transparency of the background picture to be larger than the transparency of the application picture.

4. The method according to claim 2, further comprising, before modifying the at least one of the grayscale, the luminance, the chrominance, or the transparency of the at least one of the application picture or the background picture:
    judging whether at least one of the grayscale or the transparency of the background picture is smaller than a sum of the at least one of the grayscale or the transparency of the application picture and a preset amplitude for the at least one of the grayscale or the transparency; and
    if so, increasing the at least one of the grayscale or the transparency of the background picture to be equal to or larger than the sum; or
    judging whether at least one of the luminance or the chrominance of the background picture is larger than a difference between the at least one of the luminance or the chrominance of the application picture and a preset amplitude for the at least one of the luminance or the chrominance; and
    if so, reducing the at least one of the luminance or the chrominance of the background picture to be equal to or smaller than the difference.

5. The method according to claim 1, wherein:
    the background picture is a picture of the actual environment in which the target application is not running; and
    displaying the combination of the application picture and the background picture in the preview environment on the screen includes:
        overlaying the application picture on the background picture to obtain an overlaid picture; and
        displaying the overlaid picture in the preview environment on the screen.

6. The method according to claim 1, wherein:
    the background picture is a picture of the actual environment in which the target application has been applied but with the application picture being clipped from a clipped region; and
    displaying the combination of the application picture and the background picture in the preview environment on the screen includes:
        filling the application picture into the clipped region of the background picture to obtain a filled picture; and
        displaying the filled picture in the preview environment on the screen.

7. A terminal, comprising:

a screen;

a processor; and a non-transitory computer-readable storage medium storing instructions that, when executed by the processor, cause the processor to:

detect a preview event;

determine, in response to detecting the preview event, an application picture of a target application running in the terminal and an actual environment for the target application;

obtain a background picture according to the actual environment;

perform an image processing on at least one of the application picture and the background picture, so that a significance of the application picture is higher than a significance of the background picture; and display a combination of the application picture and the background picture in a preview environment on the screen.

8. The terminal according to claim 7, wherein the instructions further cause the processor to:

modify at least one of a grayscale, a luminance, a chrominance, or a transparency of the at least one of the application picture or the background picture.

9. The terminal according to claim 8, wherein the instructions further cause the processor to:

increase the transparency of the background picture to be larger than the transparency of the application picture.

10. The terminal according to claim 8, wherein, before causing the processor to modify the at least one of the grayscale, the luminance, the chrominance, or the transparency of the at least one of the application picture or the background picture, the instructions further cause the processor to:

judge whether at least one of the grayscale or the transparency of the background picture is smaller than a sum of the at least one of the grayscale or the transparency of the application picture and a preset amplitude for the at least one of the grayscale or the transparency; and if so, increase the at least one of the grayscale or the transparency of the background picture to be equal to or larger than the sum; or judge whether at least one of the luminance or the chrominance of the background picture is larger than a difference between the at least one of the luminance or the chrominance of the application picture and a preset amplitude for the at least one of the luminance or the chrominance; and if so, reduce the at least one of the luminance or the chrominance of the background picture to be equal to or smaller than the difference.

11. The terminal according to claim 7, wherein:

the background picture is a picture of the actual environment in which the target application is not running; and the instructions causing the processor to display the combination of the application picture and the background picture in the preview environment on the screen include instructions causing the processor to:

overlay the application on the background picture to obtain an overlaid picture; and display the overlaid picture in the preview environment on the screen.

12. The terminal according to claim 7, wherein:

the background picture is a picture of the actual environment in which the target application has been applied but with the application picture being clipped from a clipped region; and the instructions causing the processor to display the combination of the application picture and the background picture in the preview environment on the screen include instructions causing the processor to:

fill the application picture into the clipped region of the background picture; and display the filled picture in the preview environment on the screen.

13. A non-transitory computer-readable storage medium having stored therein instructions that, when executed by a processor of a mobile terminal, cause the mobile terminal to:

detect a preview event;

determine, in response to detecting the preview event, an application picture of a target application running in the mobile terminal and an actual environment for the target application as triggered by a preview event;

obtain a background picture according to the actual environment;

perform an image processing on at least one of the application picture and the background picture, so that a significance of the application picture is higher than a significance of the background picture; and display a combination of the application picture and the background picture in a preview environment on a screen of the mobile terminal.

14. The medium according to claim 13, wherein the instructions further cause the mobile terminal to:

modify at least one of a grayscale, a luminance, a chrominance, or a transparency of the at least one of the application picture or the background picture.

15. The medium according to claim 14, wherein the instructions further cause the mobile terminal to:

increase the transparency of the background picture to be larger than the transparency of the application picture.

16. The medium according to claim 14, wherein, before causing the mobile terminal to modify the at least one of the grayscale, the luminance, the chrominance, or the transparency of the at least one of the application picture or the background picture, the instructions further cause the mobile terminal to:

judge whether at least one of the grayscale or the transparency of the background picture is smaller than a sum of the at least one of the grayscale or the transparency of the application picture and a preset amplitude for the at least one of the grayscale or the transparency; and if so, increase the at least one of the grayscale or the transparency of the background picture to be equal to or larger than the sum; or judge whether at least one of the luminance or the chrominance of the background picture is larger than a difference between the at least one of the luminance or the chrominance of the application picture and a preset amplitude for the at least one of the luminance or the chrominance; and if so, reduce the at least one of the luminance or the chrominance of the background picture to be equal to or smaller than the difference.

17. The medium according to claim 13, wherein:

the background picture is a picture of the actual environment in which the target application is not running; and the instructions causing the mobile terminal to display the combination of the application picture and the background picture in the preview environment on the screen include instructions causing the mobile terminal to:

overlay the application on the background picture to obtain an overlaid picture; and display the overlaid picture in the preview environment on the screen.

18. The medium according to claim 13, wherein:

the background picture is a picture of the actual environment in which the target application has been applied but with the application picture being clipped from a clipped region; and the instructions causing the mobile terminal to display the combination of the application picture and the background picture in the preview environment on the screen include instructions causing the mobile terminal to:

fill the application picture into the clipped region of the background picture; and display the filled picture in the preview environment on the screen.

* * * * *